United States Patent [19]

Ting

[11] 4,192,597
[45] Mar. 11, 1980

[54] PHOTOGRAPHIC APPARATUS FOR SELECTIVELY ACTUATING A PULSABLE ELECTRONIC STROBE

[75] Inventor: Lawrence K. M. Ting, Bedford, Mass.

[73] Assignee: Polaroid Corporation, Cambridge, Mass.

[21] Appl. No.: 955,378

[22] Filed: Oct. 27, 1978

[51] Int. Cl.² .............................................. G03B 15/03
[52] U.S. Cl. ...................................... 354/145; 354/62
[58] Field of Search .................... 354/62, 79, 33, 126, 354/145; 350/19; 128/6; 315/241 P, 241 S

[56] References Cited

U.S. PATENT DOCUMENTS

| | | | |
|---|---|---|---|
| 3,438,766 | 5/1966 | Biber | 354/145 |
| 3,638,643 | 2/1972 | Hotchkiss | 128/9 |
| 3,696,720 | 10/1972 | Vinson | 354/22 |
| 3,725,734 | 4/1973 | Schneider | 315/241 P |
| 3,748,989 | 7/1973 | Ban | 354/145 |
| 3,999,195 | 12/1976 | Little | 354/60 L |
| 4,021,825 | 8/1975 | McCann et al. | 354/79 |
| 4,040,069 | 8/1977 | Pope | 354/27 |
| 4,058,818 | 11/1977 | Johnson et al. | 354/33 |
| 4,097,880 | 6/1978 | Yoshino | 354/145 |

OTHER PUBLICATIONS

U.S. Pat. Appl. Ser. No. 918779, filed 6/26/78 by W. T. Plummer, "Adapter for Optically Coupling a Photographic Camera with a Viewing Device."
Standford, B., "Theoretical . . . Photograph," In Joun. of Photo. Sc., vol. 3, 1955.

*Primary Examiner*—John Gonzales
*Attorney, Agent, or Firm*—Francis J. Caufield

[57] ABSTRACT

Photographic apparatus is provided for use with a pulsable type strobe light and automatic cameras of the type which, upon actuation, undergo a predetermined time delay, which varies from camera to camera within select limits, prior to their initiating an exposure cycle. The apparatus is responsive to camera actuation to provide a sequence of equally timed strobe firing signals beginning before the shortest expected time delay of these type cameras and terminating after the exposure cycle of a camera of this type which has the longest expected time delay. Operating in this manner, the apparatus assures that at least part of one strobe pulse occurs during the exposure interval of cameras of this type.

12 Claims, 6 Drawing Figures

PHOTOGRAPHIC APPARATUS FOR SELECTIVELY ACTUATING A PULSABLE ELECTRONIC STROBE

CROSS REFERENCE TO RELATED APPLICATIONS

The present application is related to U.S. patent application Ser. No. 955,338 filed concurrently herewith in the name of Edward A. Yobaccio and entitled "Rotatable Adapter For Use In Optically Coupling A Viewing Device With A Photographic Camera" and to U.S. patent application Ser. No. 955,381 filed concurrently herewith in the name of William T. Plummer and entitled "Optical Adapter Having Film Contrast Control Means".

BACKGROUND OF THE INVENTION

1. Field of the Invention

This invention relates generally to apparatus for use in endoscopic photography but, more particularly, to apparatus by which a rapidly pulsable strobe, when used in combination with a particular type of automatic camera, can be successively fired a plurality of times over a predetermined interval so that when any camera of the type is used with the strobe at least part of at least one strobe pulse will occur during the camera's exposure cycle.

2. Description of the Prior Art

Endoscopes are optical viewing devices well known to the medical profession for their usefulness in diagnosing disease. With an endoscope, a physician, typically a surgical consultant, visually examines the interior of a patient's body organs for pathological processes whose presence is suspected or indicated by clinical and laboratory findings.

Once detected, a pathology is then carefully studied to determine its precise nature and extent so that the proper course of treatment can be decided upon and recommended to the patient.

For a variety of reasons, it is often advantageous for the surgical consultant to have a permanent photographic record of the endoscopic findings. Such records are useful, for example, for their educational value. Also, they can form part of the patient's permanent medical file or can be used as a basis for evaluating changes in the pathology. Additionally, endoscopic photographs serve as a powerful tool for promoting communication between the examining physician and others involved or interested in the diagnosis and as a means for informing the patient about the nature of his illness.

Although endoscopic photographs have their beneficial uses, they are somewhat difficult to obtain because the clinical form of most endoscopes generally is unsuitable for photography, because of the requirements of medically sound and safe practice, and because of the overriding concern for patient safety and comfort.

Photographic and optical principles, for instance, demand that any camera chosen for use with an endoscope must be able to be focused on the image provided by the endoscope's eyepiece, that adequate lighting be provided to assure acceptably exposed photographs, and that the examining physician, and sometimes more than one, be able to see an image of the field under examination immediately before and after a picture is taken in case of stills and continuously in the case of motion pictures. And all of this must be accomplished by apparatus which ideally shares the endoscope's single optical path.

Sound clinical procedure, on the other hand, imposes certain design constraints which make it difficult to satisfy the photographic and optical requirements for endoscopic apparatus. One major obstacle, for example, is the clinical desirability of using only one endoscope for both the visual clinical examination and the photographic work. It is neither convenient for the examining physician nor fair to the patient to have to withdraw the clinical endoscope once a pathology has been located, insert the photographic endoscope, photograph the field of interest, withdraw the photographic endoscope and reinsert the clinical endoscope. A process like this would obviously complicate an endoscopic examination by adding additional risk and discomfort to what is inherently an uncomfortable ordeal to begin with. Also, since the endoscope must be manipulated quite a bit throughout the examination, any photographic apparatus designed for use with the clinical endoscope should not hamper the physician's freedom of movement or require extensive operations involving attachment and detachment of the photographic apparatus with the endoscope.

Consequently, apparatus used for endoscopic photography must be easy to use, e.g. manipulate, must not unduly prolong the endoscopic examination, ideally should be mechanically and optically compatible with an existing form of clinical endoscope and, as well, must be capable of reliably reducing photographs which are acceptably exposed while containing adequate detail.

Finally, such apparatus must be absolutely safe and must, in particular, be free from any danger of causing electrical shock or creating unduly high temperatures which may come into contact with the patient.

Given the above general considerations, it is evident that the problems associated with providing apparatus for use in endoscopic photography are varied—involving both technical and humane considerations. In the past, these problems have been dealt with in a variety of ways by providing either specially designed photographic systems whose use is limited to endoscopic photography or by providing adapters by which existing cameras can be used with an existing endoscope. For examples reference may be had to U.S. Pat. No. 3,368,643 issued to John E. Hotchkiss on Feb. 1, 1972 and entitled "Endoscope For Photograpic Recording"; U.S. Pat. No. 3,918,072 issued to Toshihiro Imai et. al. on Nov. 4, 1975 and entitled "Single-Lens Reflex Optical System For An Endoscope"; U.S. Pat. No. 3,995,287 issued to Karl Storz on Nov. 30, 1976 and entitled "Endoscopic Camera"; U.S. Pat. No. 3,900,021 issued to Anthony Peter Walter Makepeace et. al. on Aug. 19, 1975 and entitled "Coupling For Endoscopes And Instruments Particularly Cameras"; U.S. Pat. No. 3,994,288 issued to Joseph G. Stumpf on Nov. 30, 1976 and entitled "Colposcope", and an article by Brian Stanford which appears in *The Journal of Photographic Science,* volume 3, 1955, and is entitled "Theoretical First Principles of Endoscopic Photography".

However, none of the foregoing publications appear to deal directly with the specific problem with which the present invention is concerned. In particular, the primary object of the present invention is to provide apparatus for use in endoscopic photographic work by which a well-known type of rapidly pulsable strobe when used in combination with a well-known type of automatic camera is successively fired a plurality of times over a predetermined interval so that, when the strobe is used with any one of the cameras from the well-known type to provide illumination of an endoscopic object field, at least part of one of the strobe pulses will occur during the camera's exposure cycle to assure adequate film exposure.

The prior art contains descriptions of apparatus by which an electronic flash unit can successively and repetitively be triggered to discharge either a plurality of capacitors or to discharge a single capacitor incrementally to provide adequate illumination in synchronization with the exposure cycle of a single camera. For examples of such apparatus reference may be had to U.S. Pat. No. 3,725,734 issued to Arthur Schneider on Apr. 30, 1973 and entitled "Electronic Flash Device"; U.S. Pat. No. 3,748,989 issued to Itsuki Ban on July 31, 1973 and entitled "Electronic Flash System"; and U.S. Pat. No. 3,438,766 issued to Conrad H. Biber on Apr. 15, 1969 and entitled "Electronic Flash Apparatus Having Variable Output". However, the apparatus of these disclosures appear to be responsive during a flash mode of operation of the camera to receiving a flash firing signal which occurs in synchronization with the opening of the camera shutter with which they are employed. For reasons which will become apparent in the description of the invention to follow, the type of camera with which the present invention is particularly useful provides no such signal in its ambient mode of operation which is the mode in which it is required to operate in its present application and therefore the above prior art apparatus would not provide the solution to the problem which is solved by the present invention.

It is also well known to operate the camera with which the present invention is used in its ambient mode of operation in combination with an electronic strobe such that the strobe is fired at a predetermined delay after the commencement of the camera photographic cycle. However, this operation provides no means of controlling the duration of the camera's exposure interval during its ambient exposure mode of operation while at the same time repetitively and successively firing an electronic strobe, all of which is a further object of the present invention.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention relates generally to photography but, more specifically, to photographic apparatus for use with an electronic strobe of a well-known type which produces a light pulse of given intensity and duration in response to receiving a predetermined input switching signal and has a recharge time which is substantially shorter than the light pulse's duration and automatic cameras of a well-known type which, upon actuation, begin a photographic cycle during which film exposure commences after a predetermined delay upon the opening of an electro-mechanical shutter and thereafter is automatically terminated by a light sensing circuit which measures scene brightness and commands the shutter to close upon detection of a predetermined exposure value and wherein the predetermined delay time to initiation of film exposure varies from camera to camera.

The apparatus of the invention comprises means responsive to camera actuation for providing an electrical output signal at the instant the camera is actuated.

Also provided are means, responsive to the electrical output signal, for presenting to the camera's light sensing circuit at least one predetermined level of illumination equivalent to a predetermined scene brightness by which the camera's shutter is caused, via its light sensing circuit, to remain open for a select time.

Additionally included are electrically actuable means connectable to the strobe for providing to the strobe, upon actuation, the predetermined input switching signal by which the strobe is fired.

The apparatus also includes control means, electrically coupled with the electrically actuable means and responsive to the electrical output signal, for actuating the electrically actuable means such that a plurality of strobe input switching signals are provided in a sequence of equal intervals which begins at a predetermined time before the shortest possible camera delay time and terminates after the exposure interval following the longest possible delay time so that whenever a camera of the type is used with the strobe type and the apparatus at least a portion of a strobe pulse will occur during the select exposure interval of this type camera.

In the preferred embodiment of the apparatus, the control means comprises an astable multivibrator connected with an electromagnetic relay and arranged to be responsive to an input signal to produce an output pulse train of predetermined frequency. The pulse train operates to actuate the electromagnetic relay. A monostable multivibrator is connected with the astable multivibrator and is arranged to provide the astable multivibrator's input signal at the predetermined time before the shortest possible camera delay time in response to receiving the electrical output signal and to automatically remove the astable multivibrator's input signal after the exposure interval following the longest possible camera delay time.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
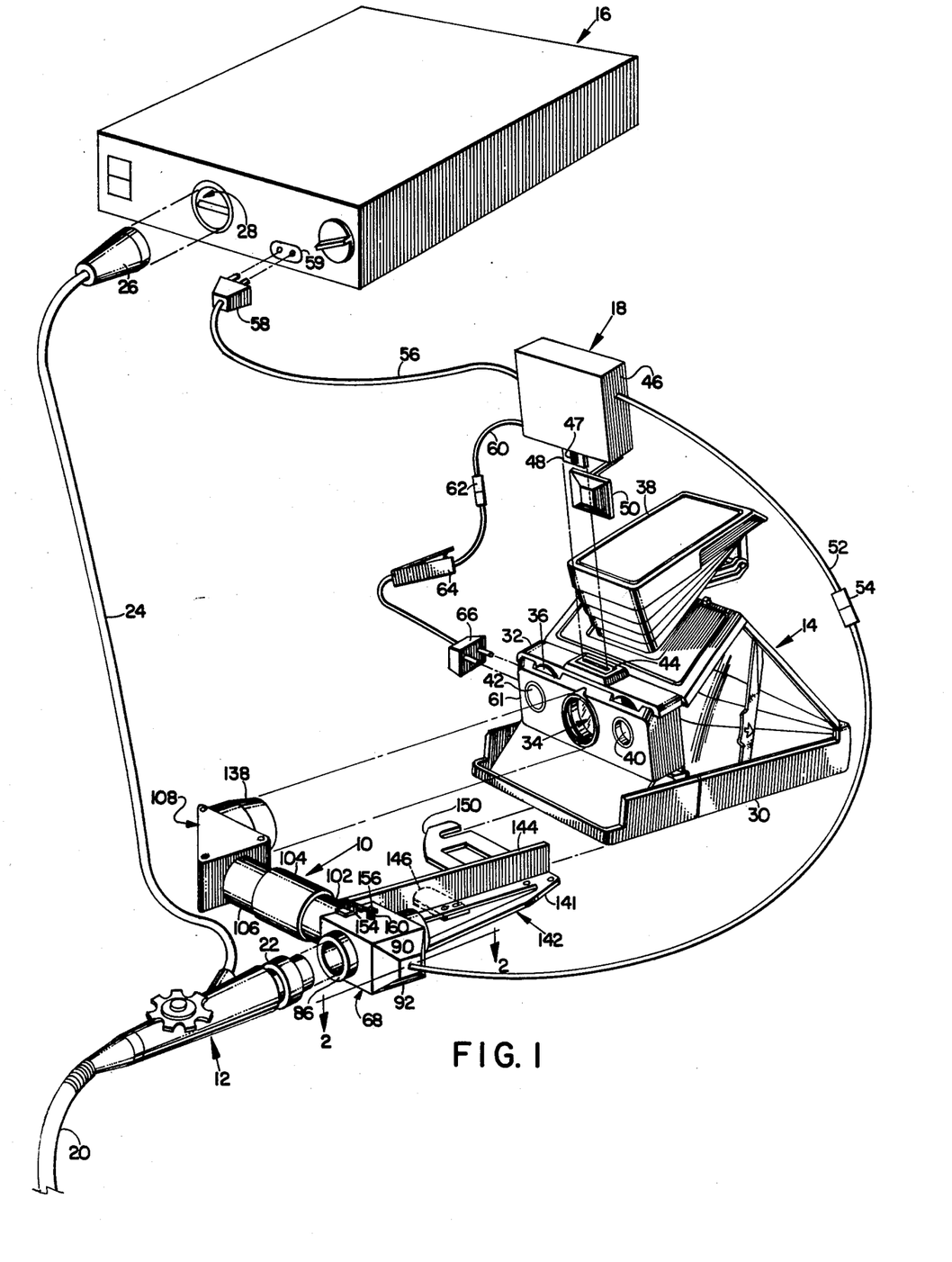
FIG. 1 is a diagrammatic perspective view of the preferred embodiment of the apparatus of the invention shown in combination with a photographic camera, an endoscope, an optical adapter, and an artificial light source.

Referring now to FIG. 1, there is shown generally at 18 an electronic control device which is the preferred embodiment of the present invention and which is shown in combination with a clinical endoscope 12, an automatic camera 14, an electronic artificial light source 16 and an adapter 10. The adapter 10, the photographic camera 14, the electronic light source 16, and the electronic control device 18 of the invention collectively form a photographic system for practicing endoscopic photography in a manner which will be more readily apparent as this description proceeds.

The clinical endoscope 12 constitutes an optical viewing device of the type which has a field of view that is larger than the diameter through which the field can be viewed and wherein the field is located several diameters away from the aperture through it is viewed. As best shown in FIG. 1, the endoscope 12 comprises an elongated flexible fiber optic bundle 20 which has an objective lens system (not shown) located at its distal end for forming on the distal end of the fiber optic bundle 20 a real image of the object or field being explored by an examining physician. The image formed on the distal end of the fiber optic bundle 20 is then transferred in a well-known manner via the fiber optic bundle 20 to the proximal end of the endoscope 12 where it is then reimaged by an eyepiece 22 which forms a collimated-to-nearly-collimated image of the object which is located at the distal end of the endoscope 12.

The object under examination is illuminated via another fiber optic bundle 24 which receives light at its proximal end from a lamp assembly generally designated at 28 and located in the light source 16. The lamp assembly 28 can be operated in a well-known manner in a steady state mode to provide a continuous source of illumination which is optically coupled in a well-known manner with the fiber optic bundle 24 via an adapter 26. The adapter 26 may include a condenser lens system for providing even illumination of the field under investigation and may also include a heat absorbing filter which cools the light thereby keeping the distal end of the endoscope 12 at a safe operating temperature so as not to endanger a patient.

In addition to its continuous mode of operation, the light source 16 also operates in a strobe mode in which it produces a light pulse of given intensity and duration (see FIG. 5) in response to receiving an input switching signal via a socket 59 thereof. Immediately after receiving an input switching signal, the light source 16 automatically recharges in preparation for firing another light pulse, and the time it takes to recharge is substantially shorter than the duration of the light pulse so that it can produce a series of successive light pulses so long as the appropriate input switching signals are provided to it via the socket 59.

As is well known, the physician conducting the endoscopic examination views the interior of the patient's body organ that is suspected of having a pathology through the eyepiece 22 of the endoscope 12 until he locates the particular pathology. The purpose of the adapter 10 is to optically and mechanically couple the photographic camera 14 with the eyepiece 22 of the endoscope 12 so that the image of the field or object formed by the endoscope 12 can be simultaneously viewed and photographed.

The camera 14 may be any of a number of well-known types but, as illustrated, represents Polaroid Corporation's SX-70 Land Camera which is fully automatic having an automatic exposure control system and is adapted to accept the well-known self-processable SX-70 color film which is processed by the camera in a well-known manner immediately after it has been exposed.

The camera 14 can be operated in an ambient exposure mode in which available light provides the source for illuminating the scene or in a flash mode in which the source for illuminating the scene can either be a well-known linear photoflash array or an electronic strobe.

Included in the camera 14 is a base housing member 30 which is adapted in a well-known manner to releasably hold film cassettes (not shown) of the aforementioned type of film. Such film cassettes, as is also well-known, include a stacked array of self-processable film units unerneath which is positioned a flat, thin battery which is used to supply power to operate the various electrical components of the camera 14. An example of such film cassettes is described in considerable detail in U.S. Pat. No. 3,872,487 issued to Nicholas Gold on Mar. 18, 1975 and entitled "Photographic Film Assemblage and Apparatus" and of such film units in, for example, U.S. Pat. Nos. 3,415,644; 3,594,165; and 3,761,268.

Camera 14 also includes a forward housing section 32 in which is disposed an objective taking lens 34 which can be focused in a well-known manner via a focus control wheel 36.

Additionally included in the camera 14 is a through-the-lens viewing system by which an object to be photographed can be observed through the objective taking lens 34 via a reflex arrangement (not shown) and a viewing device 38 located on the uppermost part of the camera 14. In practice, a photographer, while looking through the viewing device 38, aims the camera 14 at the object he wishes to photograph and rotates the focusing wheel 36 to adjust the focus of the objective lens 34 until the image of the object to be photographed is sharp. The focusing range over which this may be accomplished covers distances as near as 10.4 inches and as far as infinity.

Once the camera 14 has been focused, a photographic cycle is initiated by depressing a camera start button or switch 42 which is also located in the forward housing section 32 and which couples the film cassette's battery with the various electrical components of the camera 14. During the photographic cycle film exposure commences after a predetermined delay upon the opening of an electromechanical shutter (not shown) and thereafter is automatically terminated after a light sensing circuit, including a light sensing element 40, measures scene brightness and commands the shutter to close upon detection of a predetermined exposure value. For a more detailed description of the camera 14, reference may be had, for example, to U.S. Pat. No. 3,714,879 issued to Edwin H. Land et al. on Feb. 6, 1973 and entitled "Reflex Camera".

Figure 2:
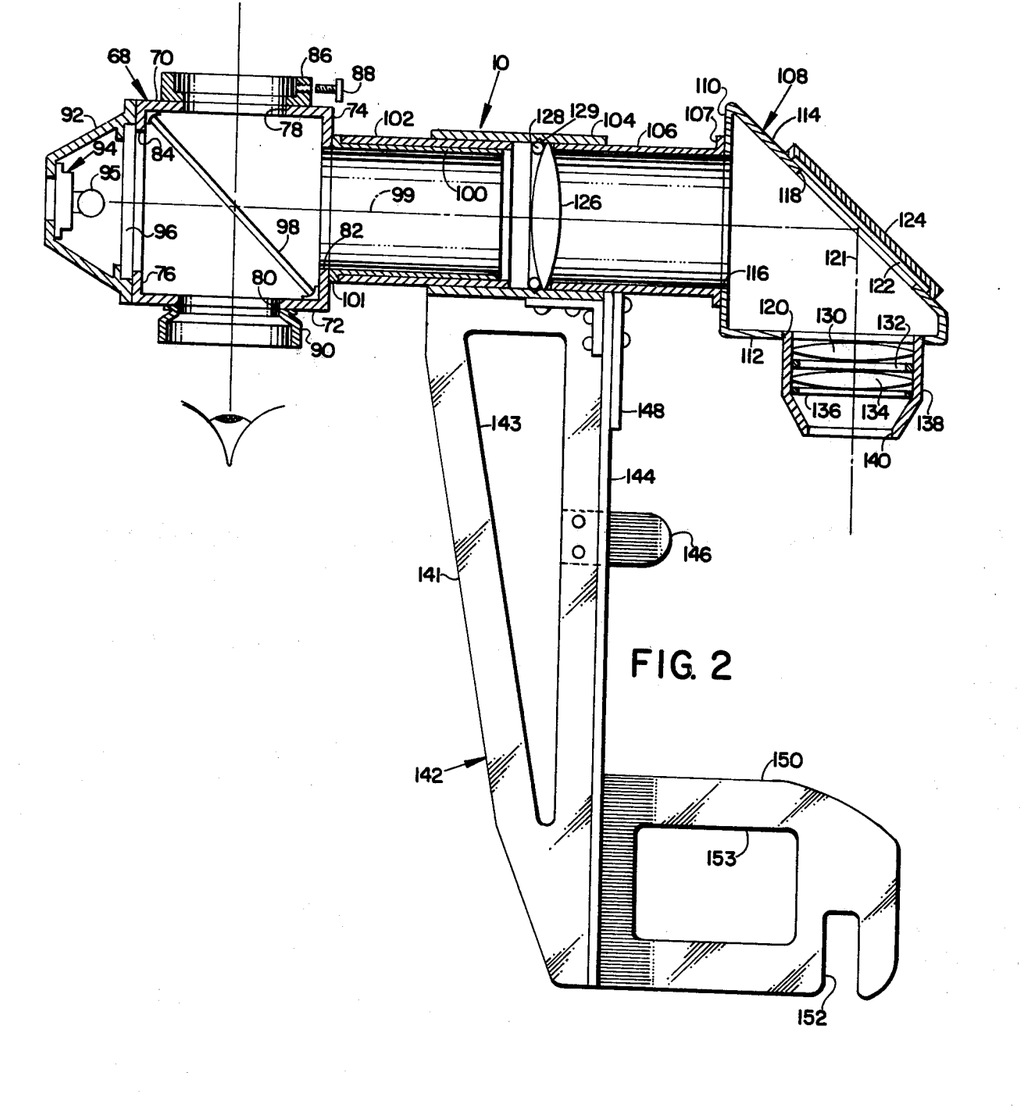
FIG. 2 is an enlarged top view of the adapter shown in FIG. 1 partially sectioned along line 2—2 of FIG. 1.

Referring now to FIGS. 1 and 2, the structure and operation of the various components which make up the adapter 10 will now be described. In those figures, it can be seen that the adapter 10 comprises a generally cube-shaped housing section 68 which includes (see FIG. 2)

a forward wall 70, a rear wall 72 spaced from the forward wall 70, and a right side wall 74 and a left side wall 76 which interconnect the forward wall 70 and the rear wall 72. Located in each of the walls, 70, 72, 74 and 76, of the housing section 68 are apertures 78, 80, 82 and 84 respectively. The apertures, 78 through 84, function to permit light to enter and leave the housing section 68.

Surrounding the forward wall's aperture 78 and aligned therewith is an apertured collar 86 that is selectively shaped to receive the eyepiece 22 of the endoscope 12. The eyepiece 22 is fixedly retained with the collar 86 via a thumb screw 88. When the eyepiece 22 of the endoscope 12 is inserted in the collar 86 and the thumb screw 88 tightened, its optical axis is automatically aligned with the centerline of the forward wall's aperture 78. In this manner, means are provided for forming a releasable, generally light-tight mechanical connection with the eyepiece 22 which is located at the proximal end of the endoscope 12.

The rear wall's aperture 80 is formed in the rear wall 72 so that its center is also aligned along the optical axis of the endoscope's eyepiece 22. Surrounding the rear wall's aperture 80 and concentric therewith is an apertured eyecup 90 through which the collimated image formed by the endoscope's eyepiece 22 can be viewed.

Overlying the left side wall's aperture 84 is a diffuser 96 behind which is located a lamp assembly 94, including a lamp 95, which is retained in a well-known manner to the left side wall 76 via a lamp housing 92. In general, the purpose of the diffuser 96 and the lamp 95, which also derives its power from the camera's battery via the electronic device 18, is to provide means by which the contrast of the film with which the camera 14 is used can be improved so that more of the detail of the field being photographed can be captured than would otherwise be possible absent the diffuser 96 and the lamp 95. A more detailed description regarding how this is accomplished follows and is also provided in U.S. patent application Ser. No. 955,381 filed concurrently herewith in the name of William T. Plummer and entitled "Optical Adapter Having Film Contrast Control Means".

Provided in the housing 68 is a beamsplitter 98 which diagonally extends between the forward wall 70 and the rear wall 72 at an angle of 45° to the optical axis of the endoscope's eyepiece 22. In this manner, optical means are provided which are disposed within the housing section 68 for establishing a folded light path which has one axis, aligned with the optical axis of the endoscope's eyepiece 22, along which the collimated or viewable image formed by the endoscope 12 can be directly viewed. The other axis or branch of the folded light path thus provided and designated at 99 is disposed at 90° with respect to the first axis. As is readily apparent, light rays which form the endoscope's viewable image are directed along the second branch 99 of the folded light path by the beamsplitter 98 where they pass through the right side wall's aperture 82.

The adapter 10 also includes a generally prismatic shaped housing section 108 that is triangular in cross-section and includes a wall 110 having an aperture 116 therein, a wall 112 at right angles to the wall 110 and having an aperture 120 therein, and a wall 114 which has an aperture 118 therein and is arranged at an angle of 45° with respect to both the walls 110 and 112.

The housing 108 is rotatably connected with the housing 68 via a tubular arrangement which comprises an elongated cylindrical tube section 100 that is rigidly fastened with the right side wall 74 of the housing section 68 via a flange 101 and is concentric with the right side wall's aperture 82, a cylindrical sleeve 102 that is structured for slidable engagement with the tubular section 100, another cylindrical tubular section 106 that is fixedly attached to the forward wall 110 of the housing section 108 via a flange 107 and which is concentric with the aperture 116 of the forward wall 110, and a collar 104 structured to slide over the outside surfaces of the sleeve 102 and the tubular section 106 to fixedly couple one to the other.

In the foregoing manner, the housing section 108 is rotatably coupled with the housing section 68 so that the center of the aperture 116 is colinear with the folded axis 99 of the folded light path formed by the beamsplitter 98 in the first housing section 68 and so that the light rays which form the viewable image provided by the endoscope's eyepiece 22 are directed along the folded axis 99 of the folded light path of the housing section 68 towards the aperture 116.

A first relay lens 126 is provided within the interconnecting tubular arrangement which rotatably couples the housing section 68 to the housing section 108 for the purpose of intercepting light rays which are reflected from the beamsplitter 98 as they travel along the folded optical axis 99 of the housing section 68. The relay lens 126 is structured to form at a predetermined spatial location within the adapter 10 an aerial image of the object being viewed by the endoscope's optical system. The relay lens 126 has an outside diameter which is substantially the same as the inside diameter of the collar 104 and its rear peripheral surface is retained against the annular edge of the cylindrical tubular section 106 by a lens retaining ring 128 which snaps into a groove 129 provided on the interior surface of the collar 104 for this purpose.

Overlying the aperture 118 of the diagonal wall 114 of the housing section 108 is a mirror 122 that is retained in overlying relationship with respect to the aperture 118 by a suitable mirror retainer such as that designated at 124. The mirror 122 operates in a well-known manner to intercept light rays which emerge from the relay lens 126 to redirect them along a second folded light path of the adapter 10 whose folded branch or axis designated at 121, as can best be seen from FIG. 2, is parallel with the optical axis of the endoscope's eyepiece 22.

A lens housing 138 threadably mounts within the aperture 120 of the rear wall 112 of the housing section 108 such that the center of an exit aperture 140 thereof is colinear with the folded branch 121 of the adapter's second folded optical path provided by the mirror 122. Mounted within the lens housing 138 is a second relay lens (134 and 130 taken together) that are retained therein by a pair of retainers 136 and 132 respectively and is structured in a well-known manner to allow the camera's objective taking lens 34 to be focused on the aerial image formed by the first relay lens 126.

Lens 126 and lenses 130 and 134 also are placed to act jointly in a well-known manner to form an image of the exit pupil of the endoscope's eyepiece 22 onto the entrance pupil of the camera's objective taking lens 34 as seen through the second relay lens 134. Structured in this manner, substantially all of the rays from the aerial image pass through the entrance pupil of the camera's objective taking lens 34.

It will be readily apparent to those skilled in the optical arts how to structure the various optical elements of the adapter 10 to provide the various functions as herein described.

Structured in the foregoing manner, the relay lens 126, the mirror 122, the field lens 130, and the relay lens 134 collectively define a rotationally symmetric optical system which is fixedly associated with the housing section 108 to establish a folded light path between its entrance aperture 116 and its exit aperture 120, to intercept the image forming light rays which are directed along the folded branch 99 of the folded optical path of the housing section 68 and form in a predetermined spatial location within the adapter 10 an aerial image of the object viewed via the endoscope's eyepiece 22 and for facilitating focusing of the camera's objective taking lens 34 on the aerial image by way of the aperture 140 located in the lens housing 138.

Means for releasably attaching the camera 14 to the adapter 10 are provided in the form of a bracket assembly designated generally at 142. The bracket assembly 142 comprises an elongated, generally triangular shaped, frame member 141 having one end fixedly mounted in a well-known manner to the collar 104 and portions of the tubular section 106. The frame member 141 has a hollowed out central triangular section 143 by which its weight is reduced.

As best seen in FIG. 1, the frame member 141 along one edge thereof has an upwardly extending flange 144, a locating stop 148 (FIG. 2) which is located near its fixed end. Also attached to the flange 144 is a centrally located camera support tab 146 and a camera supporting platform 150 which is located at its free end and extends outwardly in a direction generally perpendicular to the elongated dimension of the frame member 141. The platform 150 also has an apertured central portion 153 to reduce its weight and, as well, includes an elongated slot 152 for slidably receiving a thumb screw which fits into a tripod mount located, but not shown, in the base 30 of the camera 14.

As seen in FIG. 1, the camera 14 is slid alongside the locating flange 144 with the right side of its base 30 guided by the flange 144 until the right side of the forward wall of its front housing section 32 butts up against the forward surface of the stop 148. In this manner, the stop 148 and the flange 144 cooperate to align the objective taking lens 34 of the camera 14 in a predetermined manner with the exit aperture 140 of the lens housing 138. Once the camera 14 is located, the thumb screw, which extends through the slot 152 into the camera's tripod mount, is tightened to secure the camera 14 in place.

In the foregoing manner, means have been provided for releasably attaching the camera 14 to the adapter 10 so that the camera's objective lens 34 is aligned with the aperture 140 so that the viewable image formed by the endoscope's eyepiece 22 can be viewed through the aperture 140 via the camera's viewing system for purposes of focusing the camera 14 thereon and afterwards for photographing the aerial image formed by the optical system of the adapter 10 as previously described.

Figure 3:
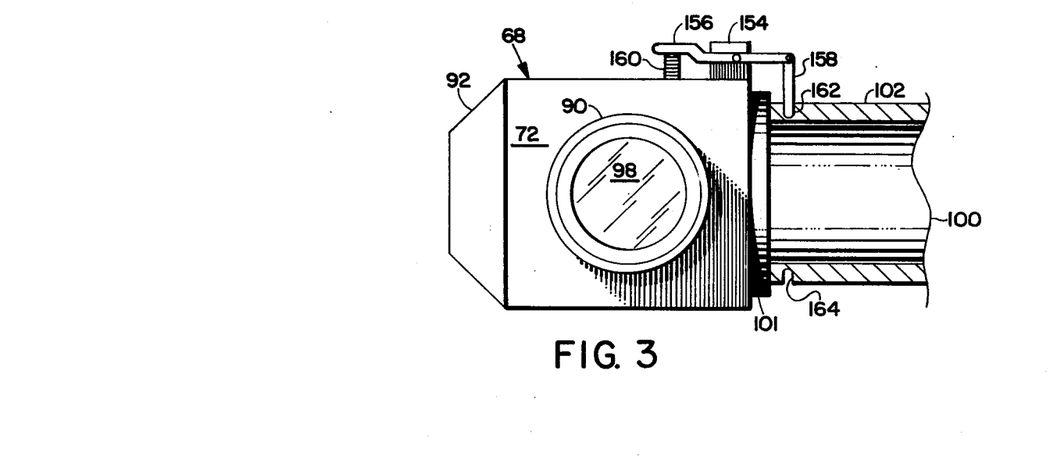
FIG. 3 is a rear elevational view of a part of the adapter shown in FIG. 1 with parts shown in section.

Referring now to FIG. 3, it can be seen that the sleeve 102 is provided with a pair of holes 162 and 164 respectively which are spaced apart by 180°. Also, mounted atop the housing section 68 is a support bracket 154 having a lever 156 pivotally mounted thereto. The forward end of the lever 156 has a pin 158 attached to it while its rear end has a compression spring 160 which is configured to bias the pin 158 downwardly toward the holes, 162 and 164, located in the collar 102. In this manner the portion of the adapter 10 which is fixedly attached to the endoscope's eyepiece 22 (i.e. housing 68 and tubular section 100) and the rotatable portion of the adapter 10 (i.e. the housing 108, the sleeve 102, the collar 104, the tubular section 106, and the bracket 142) include complementary configured portions for releasably locking one to the other so that when the rotating portion is placed in either of its angular positions with respect to the fixed portion, the sleeve 102 cannot be displaced away from the housing section 68 along the axis 99 thereby keeping the combined length of the optical path of the adaper 10 fixed regardless of the angular position of the rotatable portion of the adapter 10.

In the foregoing manner, the adapter 10 is structured to permit the viewable image of the object formed by the endoscope 12 to be directly viewed along the optical axis of the endoscope's eyepiece 22 via the exit aperture 80 of the housing section 68 or to be viewed through the camera's viewing system via the exit aperture 140 of the lens housing 138 for purposes of focusing or alternate viewing, to be photographed along the folded optical path of the housing section 108, and also structured for rotating the housing section 108, including the camera 14, with respect to the housing section 68 so that the camera 14 can be moved to a plurality of angular positions with respect to the housing section 68. After the camera is focused, the viewable image formed by the endoscope's eyepiece 22 can be photographed from any of the camera's angular positions. The availability of the plurality of angular positions of the camera thus provides the photographer with the option of placing the camera in a comfortable position for his purposes without introducing any reversals in the image as observed directly through the exit aperture 80 of the housing section 68.

The electronic control device 18 of the invention will now be discussed. As best shown in FIG. 1, the electronic control device 18 electrically mates with the adapter 10 via a cable and connector arrangement, 52 and 54 respectively; with the light source 16 via another cable 56 and a plug 58 which inserts into the complementary configured socket 59 in the light source 16; and with the camera 14 via a cable 60, a connector 62, a foot switch 64, and a plug 66 which inserts into a complementary configured socket comprising a pair of female type receptacles or terminals shown schematically in FIG. 4 at 65 and 67 located in a left side wall 61 of the camera's forward housing section 32, and via a blade 48 which depends downwardly from a housing 46 and inserts into a well-known socket assembly 44 located in the top wall of the camera's forward housing section 32. As is more fully described in U.S. Pat. No. 4,064,519, issued to Richard C. Kee on Dec. 20, 1977, and entitled "Regulated Strobe For Camera With Sixth Flash Inhibit", the electronic device 18 can derive power from the camera's battery by selectively mating a conducting strip 47 located on the blade 48 with a corresponding terminal (not shown) located in the flash socket 44 and by inserting the plug 66 into its corresponding socket previously mentioned. In this manner, the electronic device 18 can derive power from the camera's battery and operates in a manner which is more fully described herein to actuate the light source 16 in a predetermined manner during a photographic cycle of the camera 14 to insure that adequate lighting is provided while a picture is being taken.

Figure 4:
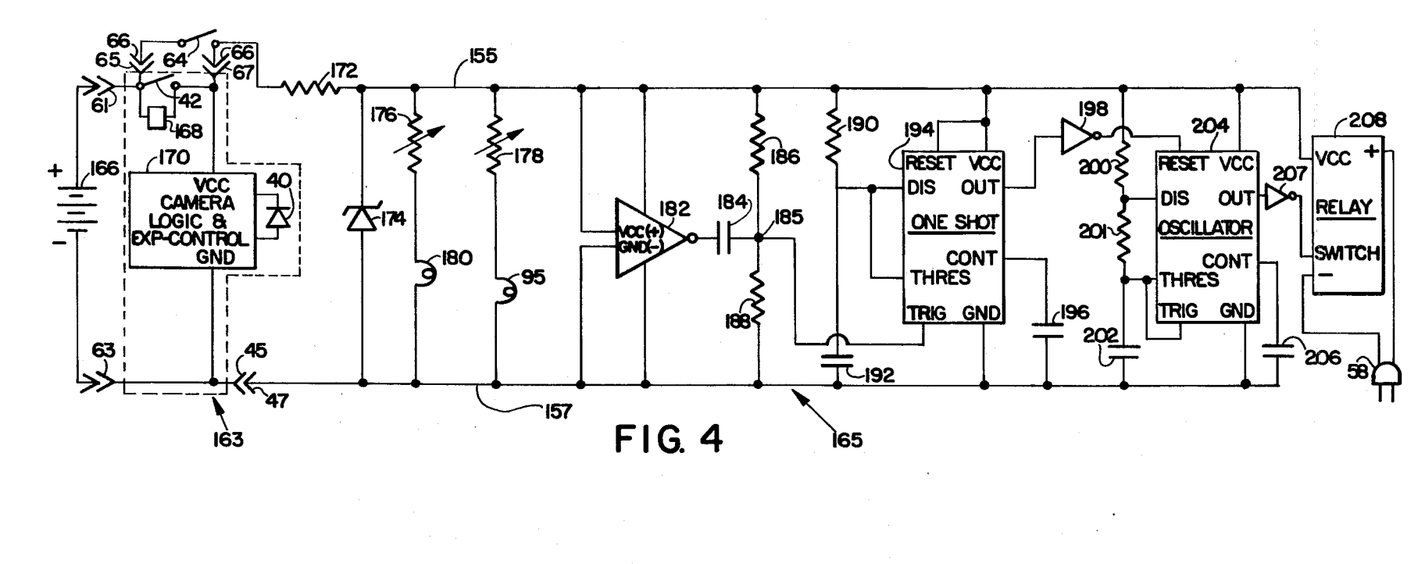
FIG. 4 is a circuit diagram of the apparatus of the invention shown in combination with a diagrammatic circuit of the electronics of the camera of FIG. 1.

Referring now to FIG. 4, there is shown generally at 165 an electronic control circuit which represents the circuitry for the electronic device 18. The circuit 165 of the control device 18 is shown in combination with the electronics for the camera 14 which are shown diagrammatically and designated generally at 163.

As previously mentioned, the camera 14 is of the fully automatic type and can be operated in either an ambient or a flash exposure mode of operation.

The camera's electronic circuit 163 comprises a well-known camera logic and exposure control circuit 170 which includes the light sensing element 40. The circuit 170 has one terminal labeled VCC which is connected to one terminal of the camera's actuator switch 42 while the other terminal of the camera's actuator switch 42 is connected to a battery connect terminal designated at 61. Another terminal of the circuit 170 that is labeled GND is connected to a second battery connect terminal designated at 63. Connected in parallel with the camera's actuator switch 42 is a well-known electronic latching circuit 168.

When a film cassette is loaded into the base 30 of the camera 14, the battery contained in the film cassette and designated at 166 automatically engages the camera's battery connect terminals, 61 and 63, in a well-known manner to make power available to the camera's electronic circuit 170.

For purposes which will become more readily apparent, the camera 14 is operated in its ambient exposure mode of operation in which its electromechanical shutter arrangement (not shown) is controlled by the output of the light sensing element 40 in such a way that its aperture and/or shutter speed are automatically set in accordance with the film's given ASA speed rating and the scene light actually detected by the light sensing element 40. More particularly, when the camera's actuator switch 42 is closed, the VCC terminal of the circuit 172 is automatically coupled to the positive terminal of the battery 166 and its terminal labeled GND to the battery's negative terminal. The latching circuit 168, which is arranged in parallel with the camera's actuating switch 42, automatically operates in a well-known manner to assure that the battery's voltage is kept supplied to the camera circuit 170 even if the actuator switch 42 opens during the camera's photographic cycle. Once actuated, the camera 14 begins a photographic cycle during which film exposure commences after a predetermined delay upon the opening of its electromechanical shutter (not shown) and thereafter is automatically terminated by a well-known light sensing circuit which includes the light sensing element 40 which measures the scene brightness and commands the shutter to close upon detection of a predetermined exposure value. The predetermined delay time prior to the opening of the camera's electromechanical shutter is necessary so that other camera operations can be completed in a predetermined sequence in readiness for the exposure portion of the camera's photographic cycle. As an example of such a camera logic and exposure control circuit reference may be had to U.S. Pat. No. 3,744,385 issued to John P. Burgarella et. al. on July 10, 1973 and entitled "Control System For Photographic Apparatus".

Figure 5:
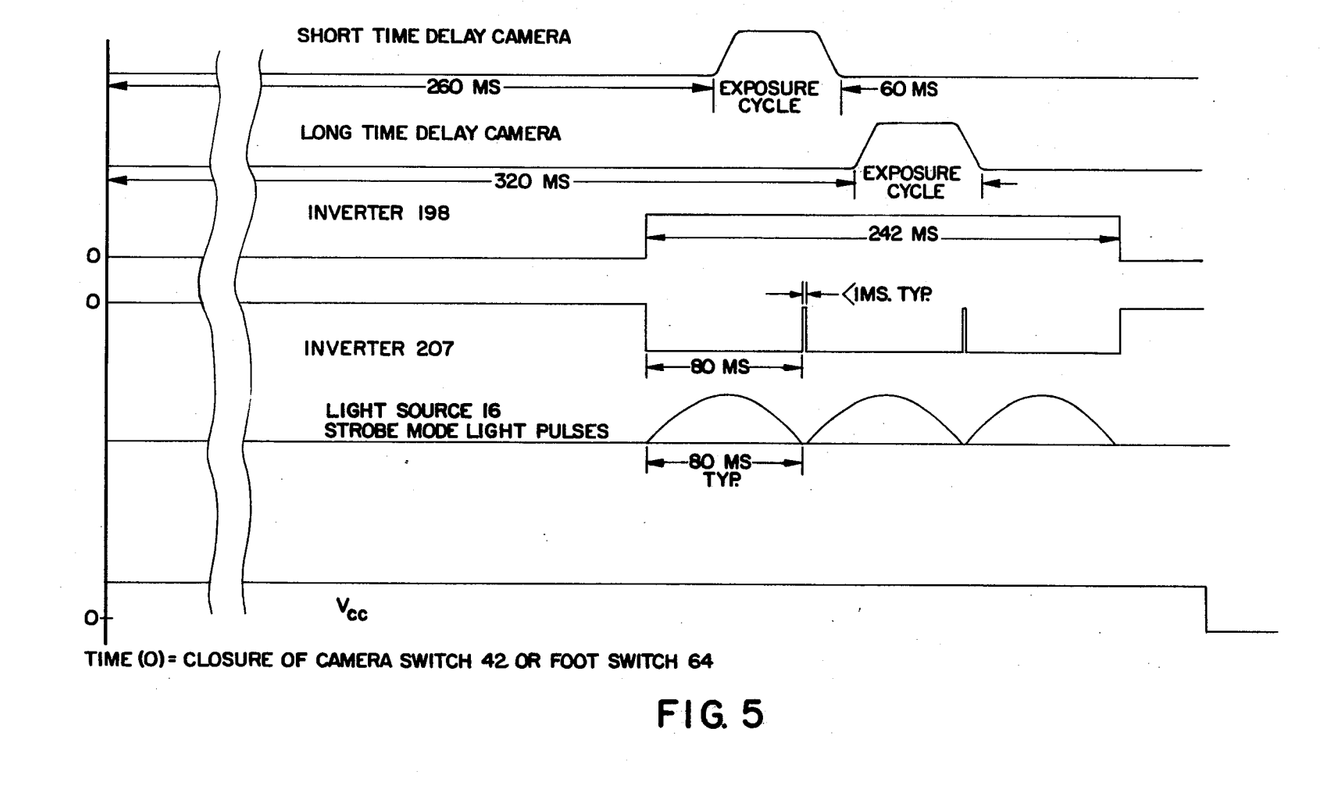
FIG. 5 is a timing diagram for the circuitry of FIG. 4.

As best illustrated in FIG. 5, the predetermined delay time prior to the initiation of film exposure for camera's of the type represented by the camera 14 varies from camera to camera within select limits typically being from 260 milliseconds for a short time delay camera to 320 milliseconds for a long time delay camera.

Because of the camera-to-camera variation in the predetermined delay time prior to the initiation of the camera's exposure cycle or exposure interval and the absence of a strobe fire pulse while the camera 14 is operated in its ambient exposure mode of operation, there is no means provided by which the electronic strobe 16 can be fired in synchronization with the opening of the camera's electromechanical shutter arrangement. Moreover, to operate the camera 14 in its flash or artificial illumination mode of operation where a flash firing pulse is available to synchronously fire the strobe 16 with the opening of the camera's electromechanical shutter arrangement is unsatisfactory because inadequate illumination is provided in this mode of operation as a result of a limitation on the length of the camera's exposure interval. Consequently, the preferred mode of operation for endoscopic photography is the ambient mode of operation where the camera's exposure interval can be made sufficiently long to admit the minimum light from the light pulse or pulses produced by the light source 16 to assure an adequate exposure.

The circuit 165 functions as a means by which any camera representative of the type of camera 14 can be used in combination with light sources of the type 16 such that the camera can be operated in its ambient exposure mode of operation in a manner whereby the exposure interval of the camera is selectively controlled and the light source 16 actuated such that a plurality of strobe pulses are provided in a sequence of equal intervals which begins at a predetermined time before the shortest possible camera delay time and terminates after the exposure interval following the longest possible delay time so that whenever any one of the type of cameras 14 is used with the light source 16, at least a portion of a strobe pulse will occur during the select exposure interval of this type camera. The manner in which the circuit 165 accomplishes this will be made readily apparent from the following description of its various components and their functions with reference to FIGS. 1, 4 and 5.

As previously discussed, the pair of spaced apart terminals designated at 65 and 67 respectively in FIG. 4 receive the prongs of the plug 66. When the plug 66 is inserted into the terminals 65 and 67, the foot switch 64 is placed in parallel connection with the camera's actuator switch 42.

The electronic device blade 48 inserts into the camera socket 44 so that a terminal 47 (see FIG. 1) engages a correspondingly configured terminal located in the socket 44 and designated diagrammatically in FIG. 4 at 45. The terminal 45 is connected to the negative terminal of the battery 166 via the camera's battery connect terminal 63.

In this manner, when the foot switch 64 is depressed, the camera's photographic cycle is automatically initiated and at the same time the battery 166 is connected to the circuit 165 and the camera control circuit 170.

A resistor 172 and a zener diode 174 are arranged in series across the positive and negative terminal of the battery 166 to regulate the voltage supplied to the circuit 165. The resistor 172 and the zener diode 174 operate in a conventional manner to maintain the voltage across a pair of lines 155 and 157 of the circuit 165 at a constant value should variations in the voltage of the battery 166 occur. In this manner, line 155 of the circuit 165 is maintained at a regulated positive potential with respect to line 157.

A rheostat 176 and a small lamp 180 are connected in series across lines 155 and 157. The lamp 180 has a light output characteristic which varies in a known manner in accordance with the voltage applied across its terminals. Lamp 180 is disposed in a well-known manner in a lamp housing 50 of the electronic device 18 (see FIG. 1) such that it covers the camera light sensing element 40 when the electronic device 18 is attached to the camera 14 by inserting its blade 48 into the camera socket 44.

In this manner, when the camera 14 is actuated by either depressing the foot switch 64 or the camera actuator switch 42, the lamp 180 operates to present to the camera light sensing element 40 at least one predetermined level of illumination that is equivalent to a predetermined scene brightness by which the camera shutter is caused, via its light sensing circuit, to remain open for a select time.

The voltage impressed across the terminals of the lamp 180 can be changed by adjusting the resistance value of the rheostat 176 which operates as a means for selectively adjusting the level of illumination presented to the camera light sensing element 40. Consequently the equivalent brightness can be presented to the camera light sensing element 40 and thus the camera shutter open time can be changed over a select range of values. In this manner, the exposure interval of the camera 14 can be either lengthened or shortened for purposes of obtaining the level of illumination that is necessary to adequately expose the film.

Also connected across the positive line 155 and the negative line 157 are a second rheostat 178 and the lamp 95 (see FIG. 2). In this manner, when the camera 14 is actuated by either depressing the foot switch 64 or the camera actuator switch 42, at least one predetermined level of uniformly diffuse illumination (i.e., non-image forming), which is independent of the illumination provided by the light source 16, is provided in the optical system of the adapter 10 prior to the camera shutter opening and thus adds to any exposure which is delivered to the film by the output of the light source 16. This additional exposure provided by the lamp 95 in combination with the diffuser 96 operates in a manner to be explained to improve the film's contrast to render more detail in darker regions of a picture without sacrificing any detail in the highlights.

The rheostat 178 is used to change the voltage applied across the lamp 95 in a well-known manner and thus constitutes a means for continuously varying over a select range, the level of non-image forming uniform illumination provided in the optical system of the adapter 10.

The circuit 165 also includes a conventional operational amplifier 182 having one terminal VCC connected to the line 155 and another terminal GND connected to the line 157. Power to operate the operational amplifier 182 is derived from the lines 155 and 157 via the operational amplifier terminals labeled + and − respectively. The operational amplifier 182 is arranged to provide an output signal which is the inverse of the signal received at its input terminals, VCC and GND.

A positive terminal of a capacitor 184 is connected to the output of the operational amplifier 182 while a negative terminal of the capacitor 184 is connected in common at a junction 185 with a voltage dividing network comprising a pair of series connected resistors 186 and 188 which are, in turn, connected across the lines 155 and 157 respectively. Junction 185 is also connected to a terminal TRIG of a well-known monostable multivibrator 194.

The multivibrator 194 has a first terminal VCC connected to the line 155 and a second terminal RESET connected in common with the terminal VCC. Other terminals of the multivibrator 194 include a third terminal DIS connected to the line 155 via a resistor 190, a fourth terminal THRES connected in common with the terminal DIS, a fifth terminal CONT connected to the negative ground line 157 via a capacitor 196, a sixth terminal GND connected to negative line 157, and a seventh terminal OUT connected to the input of a conventional inverting amplifier 198.

Connected in series with the resistor 190 is a capacitor 192 which has its positive terminal connected to one end of the resistor 190 and its negative terminal connected to the negative line 157.

Connected in this manner, the multivibrator 194 operates as a conventional "one-shot". The external capacitor 192 is initially held discharged by a transistor (not shown) in the multivibrator 194. Upon the application of a negative trigger pulse at the terminal TRIG, an internal flip flop (not shown) is set which releases the short circuit across the external capacitor 192 and drives the output from the multivibrator 194 high resulting in a logic 1 signal at the output terminal OUT. The voltage across the capacitor 192 now increases exponentially with an RC time constant T equal to the product of the resistance of the resistor 190 and the capacitance of the capacitor 192. When the voltage across the capacitor 192 equals $\tfrac{2}{3}$VCC, an internal comparator (not shown) of the multivibrator 194 resets its internal flip flop (not shown) which, in turn, rapidly discharges the capacitor 192 and drives the output to a logic 0 state.

The output of the inverting amplifier 198 is connected to a terminal RESET of a well-known astable multivibrator 204. The multivibrator 204 has a first terminal VCC connected to the positive line 155, a second terminal GND connected to the negative line 157, a third terminal CONT connected to the line 157 via a capacitor 206, and a fourth terminal OUT connected to the input of another conventional inverting amplifier 207.

An RC timing network comprising a resistor 200, a resistor 201, and a capacitor 202 is serially connected across the lines 155 and 157. Connected in common with the resistors 200 and 201 is a fifth terminal DIS of the multivibrator 204, and in common connection with one end of the resistor 201 and the positive end of the capacitor 202 is a sixth terminal THRES of the multivibrator 204. The terminal THRES and a seventh terminal TRIG are connected in common with one another.

When the multivibrator 204 receives a logic 1 signal at its terminal RESET, it will trigger and free run as a multivibrator in an astable mode of operation. The external capacitor 202 charges through the resistors 200 and 201 and discharges through the resistor 201 only. The duty cycle for the multivibrator 204 is precisely set by the ratio of the resistors 200 and 201. Thus, when a logic 1 signal is received at the terminal RESET of the multivibrator 204, it provides a plurality of output pulses at its terminal OUT which terminate whenever a logic 0 signal is received at its terminal RESET.

A conventional electromagnetic relay 208 is also provided in the circuit 165. The relay 208 has one terminal VCC connected to the positive line 155 and another terminal SWITCH connected to the output of the inverting amplifier 207. The relay 208 also has one terminal labeled + connected to the switch 58 (see FIG. 1) and another terminal labeled — which is also connected to the switch 58. The relay 208 is arranged so that whenever the output of the amplifier 207 goes low, the switch 58 closes. Closure of the switch 58, in turn, operates to fire the light source 16 in a manner previously described.

Having described the nature and function of each of the components of the circuit 165 with reference to how they operate individually and how the circuit 165 interfaces with the camera 14, the operation of the photographic system comprising the endoscope 12, the adapter 10, the camera 14, the light source 16 and the electronic device 18 of the invention will now be discussed with reference to FIGS. 1, 4 and 5.

It will first be assumed that the physician who is conducting an endoscopic examination has found a pathology or pathological process which he wishes to photograph and that the camera 14 has been properly loaded with a film cassette containing a battery. The adapter 10 is then coupled with the endoscope 12 in a manner previously described or could already be coupled with the endoscope since it will be recalled that the adapter 10 can be used to directly view the image provided by the endoscope eyepiece 22 via the adapter eyecup 90. In either event, the camera 14 is then attached to the endoscopic adapter 10 in a manner previously described. The electronic device 18 is attached to the camera 14 by inserting its blade 48 into the camera socket 44. The plug 66 is inserted into the remote camera actuating receptacles to connect with the terminals 65 and 67, and the plug 58 is inserted into the receptacle 59 of the light souce 16.

The camera 14, via its viewing device 38, is then focused in a manner previously described. After focusing the camera 14, the examining physician may then elect to rotate the camera from its focusing position in the manner previously described if he finds another camera position more comfortable or optionally may want to allow the camera to remain where it is so that another physician can simultaneously view what the endoscope 12 is imaged on.

Once the physician is ready to photograph what interests him, he depresses the foot switch 64 which operates in a manner previously described to provide a regulated voltage at lines 155 and 157 of the circuit 165. This action initiates the photographic cycle of the camera 14 simultaneously turning on the lamp 95 and the lamp 180. At this instant, the delay period prior to the initiation of the camera's exposure interval commences and, as was previously discussed, will vary from camera to camera (see FIG. 5). Thus, at the initiation of the camera photographic cycle, an electrical output signal in the form of the regulated voltage across lines 155 and 157 is provided at the instant the camera is actuated.

At the instant the camera is actuated, the inverting amplifier 182 immediately produces a low voltage output signal which is presented to the capacitor 184. The capacitor 184, in turn, provides a negative going trigger signal at the terminal TRIG of the monostable multivibrator 194. This, in turn, causes a logic 1 signal to appear at the terminal OUT of the multivibrator 194. The logic 1 signal at the output terminal of the multivibrator 194 remains high for a period of time that is shorter than the shortest possible delay time that is expected for any one of the type of camera 14.

The logic 1 output signal of the multivibrator 194 is inverted by the amplifier 198 and therefore provides a logic 0 signal at the terminal RESET of the astable multivibrator 204. In this manner, the astable multivibrator 204 is prohibited from free running in its astable mode of operation so long as the signal applied to its terminal RESET remains at a logic 0 state, and therefore, the switch 58 remains open and consequently the light source 16 remains unfired.

After a predetermined time which is related to the RC time constant of the resistor 190 and the capacitor 192, the output of the multivibrator 194 produces a logic 0 signal at its terminal OUT. This logic 0 signal in turn is then inverted by the amplifier 198 to produce a logic 1 signal at the RESET terminal of the astable multivibrator 204.

When this happens, the output of the multivibrator 204 goes high and is immediately inverted by the amplifier 207 thus causing the terminal SWITCH of the relay 208 to assume a low state. This condition immediately causes the switch 58 to close and fire the strobe to produce a first light pulse whose intensity and duration are known (see FIG. 5).

The values of the resistances 200 and 201 and of the capacitor 202 are intentionally chosen so that the logic 1 signal at the output of the multivibrator 204 remains high for a period of time that is sufficiently long enough to permit the full output of the light pulse of the light source 16 to expire and also to allow the light source 16 to recharge.

The duration of the logic 0 signal at the output terminal (OUT) of the multivibrator 204 is intentionally made extremely short compared to the duration of its logic 1 signal by selecting appropriate values for the resistor 201 and the capacitor 202 since the light source 16 will have recharged and be in readiness to be immediately fired again after the light pulse has expired. Therefore, the logic 0 output signal of the multivibrator 204 is made extremely small, say on the order of a fraction of a millisecond, so that no time is lost in firing another strobe pulse.

After the set time of the monostable multivibrator 194 elapses, its output terminal OUT automatically assumes a logic 1 state again which automatically terminates operation of the astable multivibrator 204. In practice, the set time of the monostable multivibrator 194 is selected so that the astable multivibrator 204 operates in its astable mode of operation for a period of time which begins just prior to the shortest delay expected for the camera 14 and terminates after the exposure interval following the longest expected delay for cameras of the aforementioned type.

In the foregoing manner, control means have been provided which are electrically coupled with the means for actuating the camera 14 and are responsive to actuation of camera 14 to provide a plurality of input switching signals to the light source 16 in a sequence of equal intervals which begins at a predetermined time before the shortest possible camera delay time and terminates after the exposure interval following the longest possible delay time so that whenever a camera of the type of camera 14 is used with the light source 16 in combination with the electronic device 18, at least a portion of a light pulse will occur during the select exposure interval of the camera.

Obviously, the circuit values for the circuit 165 and the duration of the camera's exposure interval may be selected so that more than one light pulse from the strobe 16 can occur during the camera's exposure interval. Thus a number of strobe pulses can be provided during the exposure interval of the camera 14 to provide enough light sufficient for proper exposure of the film. However, it should be noted that the exposure interval of the camera 14 should not be made so long where conditions indicate that camera motion may become a problem.

The influence that the diffused light, which is created by the lamp 95 in combination with the diffuser 96, has on the film will now be discussed.

As was previously discussed, the lamp 95 is turned on at the initiation of the camera photographic cycle and remains on until after the camera exposure interval is terminated. As a result of the lamp 95 being on during the exposure interval, a diffused non-image forming light of predetermined value is introduced into the optical system of the adapter 10 (see FIG. 2) by way of the beamsplitter 98 where it is added to the image forming illumination traveling to the film during the camera's exposure interval. Thus the exposure of the film consists of two parts; one which is image forming and the other which does not form an image but produces an overall fogging of the film which in general reduces the characteristic slope and thereby contrast with which the film responds to the variously luminous parts of a field being investigated. This will be more readily apparent by referring to FIG. 6 which diagrammatically illustrates in graphic form a curve 210 that represents the given sensitometric characteristics of the film that is used in the camera 14.

Figure 6:
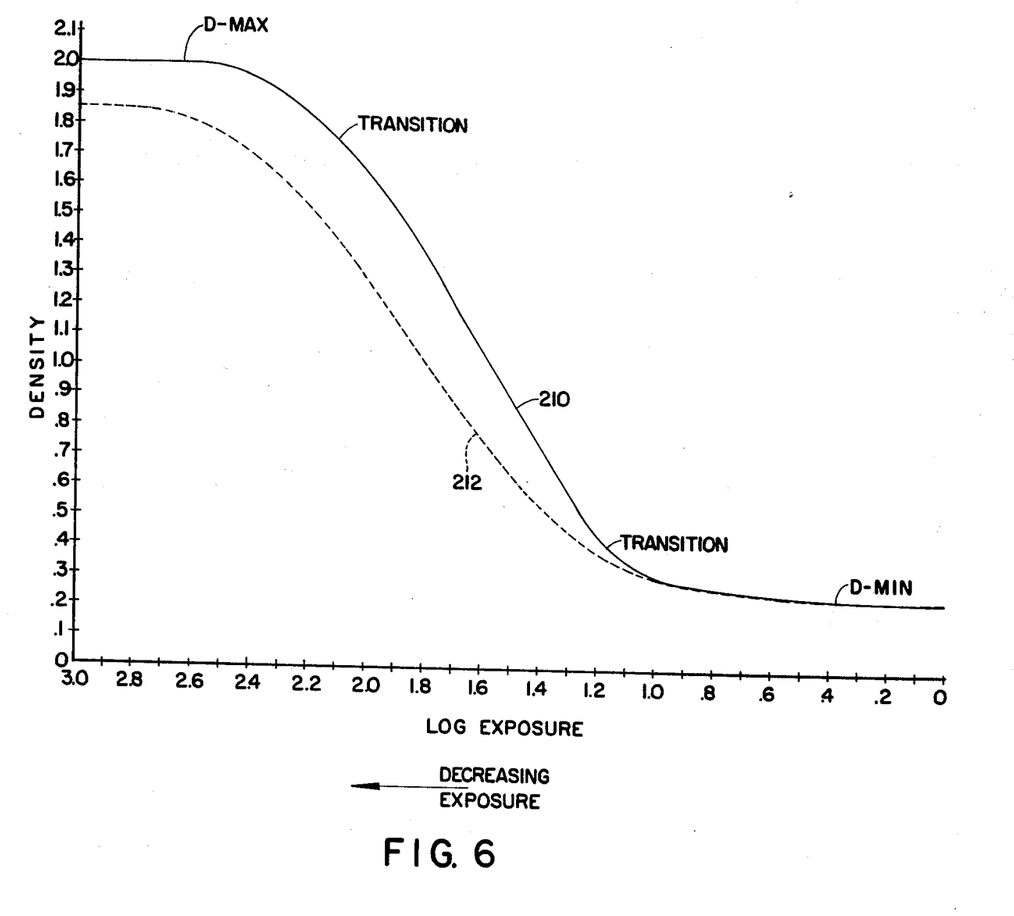
FIG. 6 is a graph diagrammatically illustrating sensitometric characteristics of a film which the camera of FIG. 1 is adapted to use.

The curve 210 shows how the density response of the film varies in correspondence with the logarithm of the exposure to which the film is subjected. As shown by the curve 210, there is a minimum density region (D-MIN) where the density does not appreciably change for a large change in exposure. Where the log of the exposure is approximately 10 percent of the maximum value (the log of the maximum exposure is equal to 0), a transition region begins where the density begins to show significant changes with changing exposure. Following this transition region there is a straight line portion of the curve 210 where the density uniformly changes with corresponding changes in the log of the exposure. This linear region is then followed by another transition region where the density continues to change with changing exposure except at a lower rate than it did within the linear region. The second transition region is followed by a region (D-MAX) where the density again no longer changes, or changes little, with changes in exposure.

So long as the field under investigation has no regions whose luminances would cause exposures which would produce densities falling outside the linear transitional regions of the film and the exposure is optimized generally about the midpoint of the linear portion of the curve 210, the photographer can be reasonably sure that all of the detail of the field will be captured in the photograph. However, if the luminances of certain parts of the field under investigation fall outside the transitional regions of the curve 210 and these parts of the field are equally as important as other parts of the field which fall within the linear and transitional regions of the curve 210, the detail contained in those parts outside the linear region of the curve 210 would be lost since, in one extreme situation, they could fall in the D-MAX region of the curve 210 where they would be too dark to see, while in the other extreme, they could fall in the D-MIN region of the curve 210 where they would be washed out.

By adding the diffused non-image forming exposure to that attributed by the output of light source 16 during the camera exposure interval, the characteristic curve of the film changes and assumes a shape which is diagrammatically illustrated in FIG. 6 in graphic form by the curve 212. It can be seen from the curve 212 that the additional non-image forming illumination operates to produce a film characteristic curve whose slope compared with that of the curve 210 is reduced thereby improving the film's contrast properties. This reduction in the rate of density change with respect to changes in the log of the exposure operates to render more detail in darker regions of the picture without sacrificing any detail in the highlights because of the large disparity in the level of exposure between the 0 and 3.0 points on the log exposure coordinate scale. Obviously, the addition of a small level of illumination to the exposure at the 3.0 position on the log exposure scale is much more significant than the density change that occurs by adding that same exposure in a region on the log exposure scale which is close to the 0 value (maxium exposure).

In the foregoing manner, means responsive to the actuation of the camera 14 have been provided for providing in the optical means of the adpater 10, at least while the camera shutter is open, at least one predetermined level of uniform illumination which is independent of the illumination provided by the light source 16, is non-image forming, and adds to the exposure delivered to the film by the strobe's output.

Certain changes may be made in the above-described embodiment without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. Photographic apparatus for use with an electronic strobe of the type which produces a light pulse of given intensity and duration in response to receiving a predetermined input switching signal and has a recharge time which is substantially shorter than the light pulse's duration and with automatic cameras of the type which, upon actuation, begin a photographic cycle during which film exposure commences after a predetermined delay upon the opening of an electro-mechanical shutter and thereafter is automatically terminated by a light sensing circuit which measures scene brightness and commands the shutter to close upon detection of a predetermined exposure value and wherein the predetermined delay time to initiation of film exposure varies from camera to camera within select limits, said apparatus comprising:

means responsive to camera actuation for providing an electrical output signal at the instant the camera is actuated;

means, responsive to said electrical output signal, for presenting to the camera's light sensing circuit at least one predetermined level of illumination equivalent to a predetermined scene brightness by which the camera's shutter is caused, via its light sensing circuit, to remain open for a select time;

electrically actuable means connectable to the strobe for providing to the strobe, upon actuation, the predetermined input switching signal by which the strobe is fired; and control means, electrically coupled with said electrically actuable means and responsive to said electrical output signal, for actuating said electrically actuable means such that a plurality of strobe input switching signals are provided in a sequence of equal intervals which begins at a predetermined time before the shortest possible camera delay time and terminates after the exposure interval following the longest possible delay time so that whenever a camera of the type is used with the strobe type and said apparatus at least a portion of a strobe pulse will occur during the select exposure interval of this type camera.

2. The apparatus of claim 1 further including means for selectively adjusting said illumination presenting means so that the equivalent brightness presented to the camera's light sensing circuit, and consequently the camera shutter open time, can be changed over a select range of values.

3. The apparatus of claim 1 wherein said electrically actuable means comprises an electromagnetic relay which is arranged to provide the input switching signal for firing the strobe.

4. The apparatus of claim 3 wherein said control means comprises:
(a) an astable multivibrator connected with said electromagnetic relay and arranged to be responsive to an input signal to produce an output pulse train of predetermined frequency, said pulse train operating to actuate said electromagnetic relay; and
(b) a monostable multivibrator connected with said astable multivibrator and arranged to provide said astable multivibrator's input signal at said predetermined time before the shortest possible camera delay time in response to receiving said electrical output signal and to automatically remove said astable multivibrator's input signal in the exposure interval following the longest possible camera delay time.

5. The apparatus of claim 1 further including means for remotely actuating the camera.

6. The apparatus of claim 5 wherein said remote camera actuating means comprises a manually actuable foot switch.

7. Photographic apparatus for use with an electronic strobe of the type which produces a light pulse of given intensity and duration in response to receiving a predetermined input switching signal and has a recharge time which is substantially shorter than the light pulse's duration and with automatic cameras of the type which, upon actuation, begin a photographic cycle during which film exposure commences after a predetermined delay upon the opening of an electro-mechanical shutter and thereafter is automatically terminated by a light sensing circuit which measures scene brightness and commands the shutter to close upon detection of a predetermined exposure value and wherein the predetermined delay time to initiation of film exposure varies from camera to camera within select limits, and which also include means for facilitating the receipt of a battery for powering the camera's electrical components, a manually operable actuator including a switch for connecting the camera's electrical components with the battery to initiate the camera's photographic cycle, and specially configured socket means by which the camera's photographic cycle can be initiated independently of its actuator and by which electrical connection can be made with the battery from the exterior of the camera at least when the camera is actuated, said apparatus comprising:

means structured for mating with the camera's socket means so that the battery voltage can be supplied at the instant the camera is actuated;

means connectable with said mating means and responsive to the battery voltage for presenting to the camera's light sensing circuit at least one predetermined level of illumination equivalent to a predetermined scene brightness by which the camera's shutter is caused, via its light sensing circuit, to remain open for a selected time;

electrically actuable means connectable to the strobe for providing to the strobe, upon actuation, the predetermined input switching signal by which the strobe is fired; and control means electrically coupled with said electrically actuable means and said mating means and responsive to battery voltage for actuating said electrically actuable means such that a plurality of strobe input switching signals are provided in a sequence of equal intervals which begins at a predetermined time before the shortest possible camera delay time and terminates the exposure interval of the longest possible camera delay time so that whenever a camera of the type is used with the strobe type and said apparatus at least a portion of a strobe pulse will occur during the select exposure interval of this type camera.

8. The apparatus of claim 7 wherein said mating means includes means for remotely actuating the camera.

9. The apparatus of claim 7 further including means for selectively adjusting said illumination presenting means so that the equivalent brightness presented to the camera's light sensing circuit, and consequently the camera's shutter open time, can be changed over a select range of values.

10. The apparatus of claims 7 or 9 further including means connectable with said mating means for automatically regulating the voltage delivered from the battery.

11. The apparatus of claim 7 wherein said electrically actuable means comprises an electromagnetic relay which is arranged to provide the input switching signal for firing the strobe.

12. The apparatus of claim 11 wherein said control means comprises:
(a) an astable multivibrator coupled with said electromagnetic relay and arranged to be responsive to an input signal to produce an output pulse train of predetermined frequency, said pulse train operating to actuate said electromagnetic relay; and
(b) a monostable multivibrator coupled with said astable multivibrator and arranged to provide said astable multivibrator's input signal at said predetermined time before the shortest possible camera delay time in response to receiving said electrical output signal and to automatically remove said astable multivibrator's input signal after the exposure interval following the longest possible camera delay time.

* * * * *